US006175449B1

(12) United States Patent
Menzel et al.

(10) Patent No.: US 6,175,449 B1
(45) Date of Patent: Jan. 16, 2001

(54) TRANSMISSION POLARIZER

(75) Inventors: Wolfgang Menzel; Dietmar Pilz, both of Ulm (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/355,284

(22) PCT Filed: Nov. 14, 1998

(86) PCT No.: PCT/DE98/03348

§ 371 Date: Oct. 14, 1999

§ 102(e) Date: Oct. 14, 1999

(87) PCT Pub. No.: WO99/28993

PCT Pub. Date: Jun. 10, 1999

(30) Foreign Application Priority Data

Nov. 28, 1997 (DE) ............................................ 197 52 738
Oct. 22, 1998 (DE) ............................................ 198 48 721

(51) Int. Cl.[7] ...................................................... G02B 5/30

(52) U.S. Cl. .......................... 359/500; 359/486; 359/501; 343/700 MS; 343/843; 343/909; 343/910

(58) Field of Search .................................... 359/486, 500, 359/501; 343/700 MS, 909, 910, 843

(56) References Cited

U.S. PATENT DOCUMENTS 3,089,142 5/1993 Wickersham .
3,267,480 8/1966 Lerner .
4,857,938 * 8/1989 Tsukamoto et al. .......... 343/700 MS

FOREIGN PATENT DOCUMENTS 196 00 609 4/1997 (DE) .

OTHER PUBLICATIONS

H. Uchida et al., "A Double–Layer Dipole Array Polarizer for Planar Antenna," Scripta Technica, Inc., pp. 86–96, 1997.*

Derek A. McNamara, *An Octave Bandwidth Meanderline Polariser Consisting of Five Identical Sheets,* 1981, National Institute for Aeronautics and Systems Technology Council for Scientific and Industrial Research, IEEE, 1981, pp. 237–240.

S. Hollung, et al., *A Quasi–Optical Isolater,* 8099a IEEE Microwave and Guided Wave Letters, May 1996, No. 5, pp. 205–206.

H. Uchida, et al., *A Double–Layer Dipole Array Polarizer for Planar Antenna,* Scripta Technica, Inc., 1997, pp. 86–96.

* cited by examiner

*Primary Examiner*—Thong Nguyen
*Assistant Examiner*—Craig Curtis
(74) *Attorney, Agent, or Firm*—Venable; Robert Kinberg; Catherine M. Voorhees

(57) ABSTRACT

The invention relates to a device for changing the polarization of an incident electromagnetic wave. Existing devices to change the polarization of an incident electromagnetic wave preserve signal decoupling, i.e., the relation between useful polarization and cross-polarization of the incoming signal. Furthermore, known prior art devices are far too big for many applications. The aim of the inventive device is to improve signal decoupling. During transmission of an electromagnetic wave through the transmission polarizer, the cross-coupled fraction of an incoming signal is greatly reflected thus leading to improved decoupling of the transmitted signal. Furthermore, the transmission polarizer can be manufactured in the form of a single planar printed board. The transmission polarizer is particularly useful to change the polarization of an incident electromagnetic wave, i.e. from linear to circular polarization or vice versa, and to rotate the polarization of an incident electromagnetic wave around a fixed angle.

17 Claims, 2 Drawing Sheets

TRANSMISSION POLARIZER

BACKGROUND OF THE INVENTION

The invention relates to device for changing the polarization of an incident electromagnetic wave.

The concept of changing the polarization of an incident electromagnetic wave can have various meanings. For example, it can be understood to be the conversion of linear polarization into circular polarization or vice versa, or also a rotation of the polarization direction of the incident electromagnetic wave.

The deliberate changing of the polarization of electromagnetic waves is used in many application fields for increasing signal quality. For example, in radar technology, circular polarization is used to suppress rain echoes and thus increases the range of radar in the event of bad weather. In a similar manner, in radio communication at frequencies in the microwave range, circular polarization permits the reduction of so-called inter-symbol interferences.

Interferences of this kind are produced when electromagnetic signals are reflected against objects on the way from the transmitter to the receiver. When an electromagnetic wave is reflected, its polarization changes. In the extreme instance of a circularly polarized wave perpendicularly striking a flat reflector, the reflected wave maintains the rotational direction in space, but the propagation direction in space is reversed so that, for example a right-handed circular polarized wave becomes a left-handed circular polarized wave. Therefore an antenna designed for right-handed circular polarization cannot receive the reflected, left-handed circular polarized signal so that the interfering signal does not appear in the receiver. Correspondingly, interfering signals whose polarization direction has not been completely reversed in a reflection are muted.

One conventional device for changing the polarization of an incident electromagnetic wave, for example, is the meander-line polarizer known from the literature [Derek McNamara "An Octave Bandwidth Meander-Line Polarizer Consisting of Five Identical Sheets", IEEE—APS 1981, Vol. 1, pp. 237–240]. This has the following features:

- five dielectric printed circuit boards, which are embodied as planar and are disposed one behind the other, flat side to flat side,
- on the front side, the printed circuit boards have a number of electrically conductive lines that are disposed in a preferred direction,
- an individual line is meander-shaped and extends over the cross section of a printed circuit board,
- the meander-shaped lines on all of the printed circuit boards are aligned parallel, i.e. the two main axes of a meander-shaped line on a printed circuit board, which are disposed in the plane of the front side of the printed circuit board, and the two main axes of a meander-shaped line on another printed circuit board, which are disposed in the plane of the front side of the printed circuit board, do not differ from one another.

In particular, the multilayer structure of a meander-line polarizer made up of a number of layered printed circuit boards disposed one behind the other necessitates its comparatively large spatial breadth, which impedes the use of this polarizer in many application fields, if not actually preventing it.

With a suitable dimensioning of a meander-line polarizer, an incident electromagnetic wave with linear polarization in a direction A is converted into an electromagnetic wave with circular polarization in a rotation direction B. A second incident electromagnetic wave with a polarization perpendicular to this (cross-polarization), i.e. with linear polarization in a direction A' perpendicular to the direction A, is converted into an electromagnetic wave with circular polarization in a rotation direction B' opposite from the rotation direction B. This means that the decoupling of a signal, i.e. the relationship between useful polarization and cross-polarization, or the relationship between right-handed and left-handed circular polarization, cannot be improved by means of a meander-line polarizer.

SUMMARY OF THE INVENTION

The object of the current invention, therefore, is to disclose a device for changing the polarization of an incident electromagnetic wave, which improves the decoupling of a signal.

With regard to the device for changing the polarization of an incident electromagnetic wave, the object is attained according to the invention by virtue of the fact that the device

- has at least one dielectric printed circuit board, which is embodied as planar,
- the at least one printed circuit board has a multitude of homogeneously distributed strip conductor structures on both its front side and its back side,
- the at least one printed circuit board is composed of elementary cells, which are each comprised of a strip conductor structure on the front side of the printed circuit board, a strip conductor structure disposed opposite it on the back side of the printed circuit board, and the substrate of the printed circuit board disposed between the two strip conductor structures,
- in each elementary cell, the two strip conductor structures are disposed in such a way that the two main axes of a strip conductor structure on the front side of the printed circuit board, which are disposed in the plane of the front side, and the two main axes of a strip conductor structure on the back side of the printed circuit board, which are disposed in the plane of the back side, are respectively rotated in relation to one another by a predetermined angle.

A conspicuous optical difference between the known meander-line polarizer and a typical embodiment of the invention is comprised in that in the first, a single element—an elongated meander-line—extends over the entire cross section of a printed circuit board, while in the second, a multitude of elements—elementary cells or strip conductor structures—are disposed in rows that extend over the cross section of the printed circuit board.

A first advantage of the invention over the meander-line polarizer is comprised in that the desired changing of the polarization of an incident electromagnetic wave according to the invention can be achieved by means of a single printed circuit board and consequently, the spatial dimensions of a typical embodiment of the invention are significantly smaller than those of a meander-line polarizer, which distinctly increases the number of potential fields in which it can be used in comparison to the latter.

Primarily, though, the device according to the invention has functional differences in relation to a meander-line polarizer, by means of which the main advantage—a high degree of signal decoupling—can be achieved:

An incident electromagnetic wave with a particular polarization, for example an electromagnetic wave with linear polarization in a direction A, which strikes the device according to the invention undergoes a change in its polarization, for example into an electromagnetic wave with circular polarization in a rotation direction B. A second incident electromagnetic wave with a polarization that is perpendicular to that of the first wave (cross-polarization) is reflected to the greatest degree possible. This means that the decoupling of a signal, i.e. the relationship between useful polarization and cross-polarization, after the transmission of the signal through the device according to the invention, is decisively improved by means of the reflection of the cross-polarized portion.

Improvements in the decoupling of a signal after its transmission which go beyond this, can be achieved by means of embodiments of the invention described below, whose features contribute to the improvement both individually and in combination.

One advantageous embodiment of the invention is comprised in that each individual strip conductor structure on the front side of the printed circuit board has different geometries in the direction of its two main axes, which are disposed in the plane of the front side, and/or each individual strip conductor structure on the back side of the printed circuit board has different geometries in the direction of its two main axes, which are disposed in the plane of the back side.

These different geometries of the strip conductor structures can, for example, be produced in the form of rectangles, crosses, or ellipses. The advantages of such forms are comprised in their particularly high degree of decoupling of a signal after its transmission through the printed circuit board.

In another advantageous embodiment of the invention, in each elementary cell, the strip conductor structure on the front side of the printed circuit board and the strip conductor structure on the back side of the printed circuit board are disposed in such a way that the projections of the circumscribed polygons of the strip conductor structures of both sides of the printed circuit board onto the plane of the front side of the printed circuit board intersect one another.

Here and in the following, projection is understood to mean the perpendicular projection of coordinates with reference to the plane of the front side of the printed circuit board. A suitable coordinate system is established for example by the main axes of the strip conductor structure on the front side of the printed circuit board. The concept of the circumscribing polygon primarily relates to strip conductor structures in the form of crosses or similar forms, and signifies a shortening of the edge contour as well as an enlargement of the enclosed area, for example in such a way that a cross is circumscribed by a trapezoid or rectangle. For an elementary cell, which contains two strip conductor structures in the form of crosses, the fulfillment of the above-mentioned disposition requirement does not therefore absolutely mean that the projections of the strip conductor structures themselves also intersect.

However if this is the case, then a further improvement of the decoupling gradient can be produced as a result. Accordingly, in a more advantageous embodiment of the invention, the strip conductor structure on the front side of the printed circuit board and the strip conductor structure on the back side of the printed circuit board are disposed in such a way that the projections of the strip conductor structures of both sides of the printed circuit board onto the plane of the front side of the printed circuit board intersect one another.

Another improvement of the decoupling gradient can be achieved with an ideal, central intersection of the projections of the strip conductor structures. Accordingly, in a more advantageous embodiment of the invention, the strip conductor structure on the front side of the printed circuit board and the strip conductor structure on the back side of the printed circuit board are disposed in such a way that the projection of the intersecting point of the main axes of the strip conductor structure of the front side of the printed circuit board onto the plane of the front side of the printed circuit board coincides with the projection of the intersecting point of the main axes of the strip conductor structure of the back side of the printed circuit board onto the plane of the front side of the printed circuit board.

In additional advantageous embodiments of the invention, all of the strip conductor structures of at least one side of at least one printed circuit board have the same form and the same dimensions, and/or all of the strip conductor structures of at least one side of at least one printed circuit board have uniform distances from one another in at least one preferred direction.

In additional advantageous embodiments of the invention, the individual strip conductor structures of each side of a printed circuit board are aligned parallel to one another, and the individual strip conductor structures of each side of a printed circuit board are disposed symmetrically in relation to at least one axis disposed in the planar surface of the printed circuit board, preferably disposed in such a way that the individual strip conductor structures of each side of a printed circuit board are disposed collinearly in rows that extend perpendicularly to each other, or the individual strip conductor structures of each side of a printed circuit board are disposed in a radially symmetrical manner.

The collinear disposition of the strip conductor structures in rows that extend perpendicularly to one another can be conceived of has a homogenous filling of a rectangular pattern on the printed circuit board with strip conductor structures.

In another advantageous embodiment of the invention, this contains a number of dielectric printed circuit boards, which are embodied as planar and are disposed with their flat sides parallel to one another, one behind the other, preferably in a congruent fashion.

BRIEF DESCRIPTION OF THE DRAWINGS

Exemplary embodiments of the device according to the invention will be explained in detail below in conjunction with FIGS. 1 and 2.

DETAILED DESCRIPTION OF THE INVENTION

Figure 1:
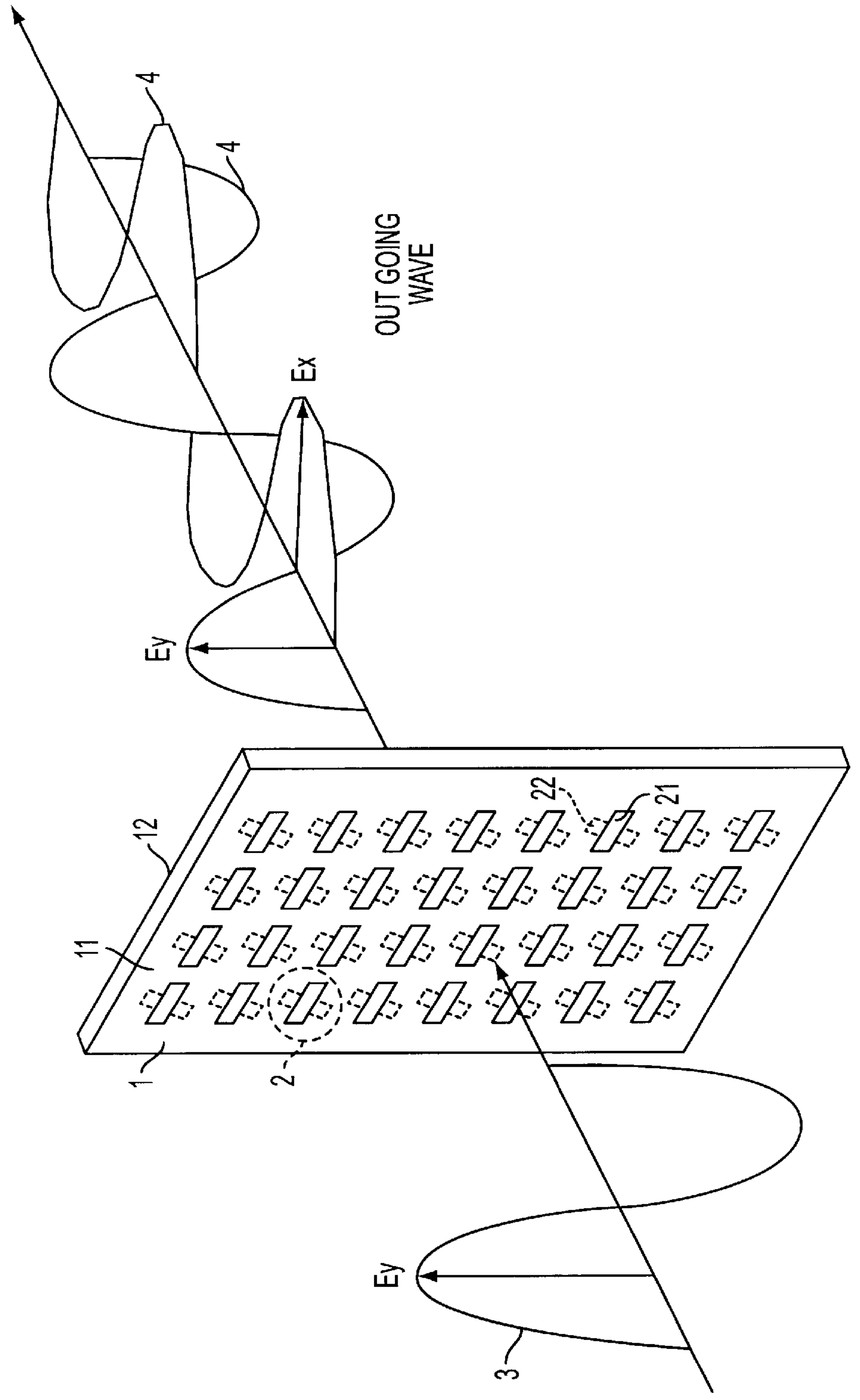
FIG. 1 shows the principal operation of the device according to the invention.

FIG. 1 shows the principal operation of the device according to the invention, here in conjunction with the particular embodiment of a planar, dielectric printed circuit board 1, which after the transmission of an incident electromagnetic wave 3, which is linearly polarized in the y direction, converts it into a circularly polarized electromagnetic wave 4. The field intensity vectors in the x and y direction are labeled Ex and Ey.

On both its front side 11 and its back side 12, the printed circuit board 1 has a multitude of homogeneously distributed strip conductor structures 21, 22. The printed circuit board 1 is made up of elementary cells 2, which are each comprised of a strip conductor structure 21 on the front side 11 of the printed circuit board 1, a strip conductor structure 22 disposed opposite from it on the back side 12 of the printed circuit board 1, and the substrate of the printed circuit board 1 disposed between the two strip conductor structures 21, 22. It should be noted that the strip conductor structures 22 disposed on the back side 12 are not shown in correct perspective in FIG. 1, but that the dashed lines respectively describe their projections onto the front side 11!

In each elementary cell 2, the two strip conductor structures 21, 22 are disposed in such a way that the two main axes of a strip conductor structure 21 on the front side 11 of the printed circuit board 1, which are disposed in the plane of the front side 11, and the two main axes of a conductor strip structure 22 on the back side 12 of the printed circuit board 1, which are disposed in the plane of the back side 12 of the printed circuit board 1, are respectively offset from each other by a predetermined angle.

An individual strip conductor structure 21 on the front side 11 of the printed circuit board 1 has different geometries in the direction of its two main axes disposed in the plane of the front side 11. Likewise, an individual strip conductor structure 22 on the back side 12 of the printed circuit board 1 has different geometries in the direction of its two main axes disposed in the plane of the back side 12. In both cases, these different geometries are produced by the embodiment of the strip conductor structures 21, 22 in the form of rectangles.

In each elementary cell 2, the strip conductor structure 21 on the front side 11 of printed circuit board 1 and the strip conductor structure 22 on the back side 12 of printed circuit board 1 are disposed in such a way that the projection of the intersecting point of the main axes of the strip conductor structure 21 of the front side 11 of the printed circuit board 1 onto the plane of the front side 11 of the printed circuit board 1 coincides with the projection of the intersecting point of the main axes of the strip conductor structure 22 of the back side 12 of the printed circuit board 1 onto the plane of the front side 11 of the printed circuit board 1. This means that the strip conductor structures 21, 22 are disposed in such a way that in this instance, the centers of the two rectangles are disposed one above the other.

All of the conductor strip structures 21, 22 of one side 11, 12 of the printed circuit board 1 have the same form and the same dimensions, namely of a respectively identical rectangle. All of the conductor strip structures 21, 22 of one side 11, 12 of the printed circuit board 1 have uniform distances in relation to one another in two preferred directions, in this instance in the horizontal and vertical direction in the planar surface of the printed circuit board 1.

The individual strip conductor structures 21, 22 of each side 11, 12 of the printed circuit board 1 are aligned parallel to one another. In addition, the individual strip conductor structures 21, 22 of each side 11, 12 of the printed circuit board 1 are disposed symmetrically in relation to two axes in the planar surface of the printed circuit board 1. In this instance, on the front side 11 of the printed circuit board 1, these are the vertical and horizontal axis through the center point, and on the back side 12 of the printed circuit board 1, these are two axes through the center point, which are respectively rotated out of the vertical and the horizontal by the same angle around the center point. Furthermore, the individual strip conductor structures 21, 22 of a respective side 11, 12 of the printed circuit board 1 are disposed collinearly in rows that extend perpendicularly to one another, and the rows that extend perpendicularly to one another on one side 11, 12 of the printed circuit board 1 respectively intersect at the center of a strip conductor structure 21, 22.

Figure 2B:
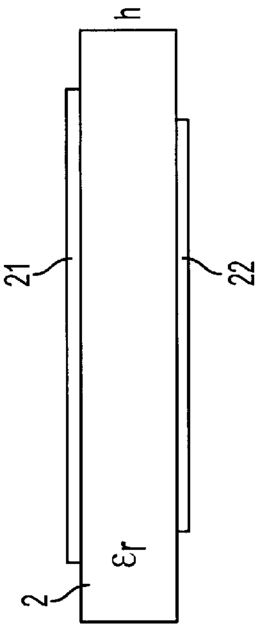
FIG. 2 shows an elementary cell of the printed circuit board according to FIG. 1.
Figure 2A:
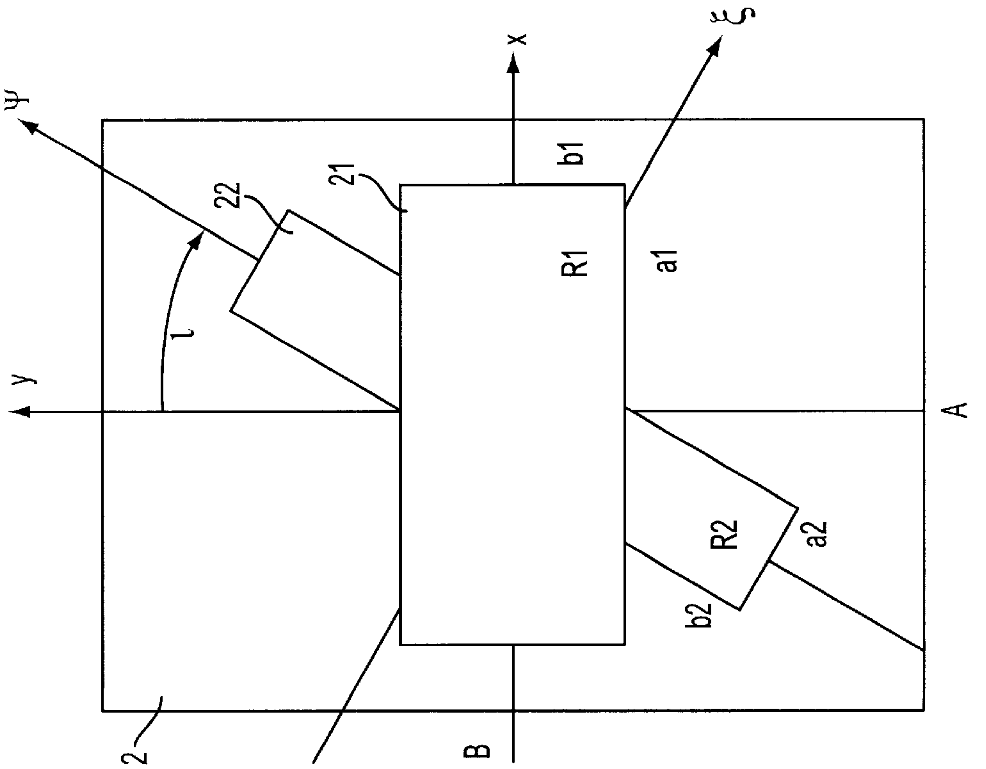

FIGS. 2*a* and 2*b* depict in detail a preferred embodiment of an elementary cell 2 of the device according to the invention, in accordance with FIG. 1. FIG. 2*a* shows a projection onto the flat side of the printed circuit board 1 according to FIG. 1, FIG. 2*b* shows a section through the printed circuit board 1 according to FIG. 1. The term elementary cell 2 is understood to mean a) a strip conductor structure 21 of the front side 11 of the printed circuit board 1, b) the substrate of the printed circuit board 1 disposed underneath it, which has the thickness h and the permittivity $\epsilon r$, and c) the second strip conductor structure 22, which is disposed on the back side 12 of the printed circuit board 1 and is rotated in relation to the first by the angle $\pi$.

In the exemplary embodiment shown in FIGS. 2*a* and 2*b*, the strip conductor structure 21 has the form a rectangle R1 with the different side lengths a1 and b1, and the strip conductor structure 22 has the form of the rectangle R2 with the different side lengths a2 and b2. By means of the different side lengths, the rectangles R1, R2 fulfill the requirement for different geometries in the direction of their respective two main axes x, y and $\xi$, $\psi$, which are disposed parallel to the plane of the front side 11 of the printed circuit board 1.

In the elementary cell 2, the strip conductor structure 21 on the front side 11 of the printed circuit board 1 and the strip conductor structure 22 on the back side 12 of the printed circuit board 1 are disposed in such a way that the projection of the intersecting point of the main axes x, y of the strip conductor structure 21 of the front side 11 of the printed circuit board 1 onto the plane of the front side 11 of the printed circuit board 1 coincides with the projection of the intersecting point of the main axes $\xi$, $\psi$, of the strip conductor structure 22 of the back side 12 of the printed circuit board 1 onto the plane of the front side 11 of the printed circuit board 1. This means that the strip conductor structures 21, 22 are disposed in such a way that in this instance, the respective centers of the two rectangles are disposed one above the other.

All of the strip conductor structures 21, 22 on both sides 11, 12 of the printed circuit board 1 have uniform average distances from one another in two preferred directions, which clearly determine their disposition on the printed circuit board 1. In this instance, the preferred directions are the x and y direction of the x-y coordinate system of the strip conductor structure 21. In the exemplary embodiment shown in FIG. 1, these directions correspond to the vertical and horizontal of the printed circuit board 1. The average distances from a strip conductor structure 21 to its respective four neighboring strip conductor structures 21 define the dimensions of an elementary cell 2. The average distance of two strip conductor structures 21 in the lateral direction of the front side 11 of the printed circuit board 1 (or in the x direction of the x-y coordinate system of the strip conductor structure 21 depicted) is labeled A in FIG. 2*a*. The average distance of two strip conductor structures in the longitudinal direction of the front side 11 of the printed circuit board 1 (or in the y direction of the x-y coordinate system of the strip conductor structure 21 depicted) is labeled B as shown in and FIG. 2*a*.

An optimal dimensioning of a printed circuit board 1 (with regard to the form R1, R2 and the dimensions a1, b1, a2, b2 of the strip conductor structures 21, 22; the distances A, B of the strip conductor structures 21, 22 of a printed circuit board side 11, 12 in relation to one another; the angle π by which the strip conductor structures 21, 22 of two printed circuit board sides 11, 12 are rotated in relation to each other; the thickness h and the permittivity Er of the printed circuit board substrate) is suitably constructed by means of the field theory calculations. Evolutions for the field intensities in the air and in the dielectric are determined here; the coefficients of these field intensities are calculated by means of the edge conditions and uniformity conditions on the metal and dielectric surfaces.

For example, for a device for changing the polarization of an incident electromagnetic wave with a frequency of 30 Gigahertz from linear polarization into circular polarization, the following optimized dimensioning results:

| | |
|---|---|
| signal frequency | 30 GHz |
| number of printed circuit boards | 1 |
| form of strip conductor structures | identical rectangles R1 on the front side 11, identical rectangles R2 on the back side 12 |
| dimensions of strip conductor structures | a1 = 3.35 mm<br>b1 = 1.65 mm<br>a2 = 0.50<br>b2 = 3.05 mm |
| disposition of strip conductor structures | rows perpendicular to one another<br>A = 4.0 mm<br>B = 5.2 mm |
| rotation of strip conductor structures | ι = 33° |
| thickness of printed circuit board substrate | h = 1.57 mm |
| permittivity of printed circuit board substrate | ϵr = 2.33 |

Correspondingly, in a second example for a device for changing the polarization of an incident electromagnetic wave with a frequency of 35 Gigahertz from linear polarization to circular polarization, the following optimized dimensioning results:

| | |
|---|---|
| signal frequency | 35 GHz |
| number of printed circuit boards | 1 |
| form of strip conductor structures | identical rectangles R1 on the front side 11, identical rectangles R2 on the back side 12 |
| dimensions of strip conductor structures | a1 = 2.76 mm<br>b1 = 1.38 mm<br>a2 = 0.30<br>b2 = 2.58 mm |
| disposition of strip conductor structures | rows perpendicular to one another<br>A = 4.74 mm<br>B = 3.01 mm |
| rotation of strip conductor structures | ι = 32° |
| thickness of printed circuit board substrate | h = 1.52 mm |
| permittivity of printed circuit board substrate | ϵr = 2.5 |

In the embodiments of these two examples, the device according to the invention turns out to be particularly suited for changing the polarization of incident electromagnetic waves with frequencies of 30 or 35 Gigahertz from linear polarization into circular polarization and therefore is suited for a use in radar technology, for example.

However, the invention is not limited to only the exemplary embodiments described, but can instead be transferred elsewhere.

For example, instead of the polarization change in the form of a polarization conversion from linear polarization into circular polarization or vice versa, it is conceivable to carry out a polarization change in the form of a rotation of the polarization for example by 90 degrees.

Potential uses for a device of this kind for rotating the polarization of an incident electromagnetic wave generally lie in the field of convoluted lenses or reflector structures, particularly in the production of a so-called fan beam (i.e. an antenna radiation, which has an intense beam in one direction, but has a weak beam or no beam at all in the other direction) with the aid of a special wave guide. A device of this kind is easy to develop if the electrical field is intended to be disposed in the direction of the large lobe width (so-called Flat H horn). There is a problem when the field is intended to be disposed in the other direction (so-called flat E horn).

With the aid of the device according to the invention, which rotates the field by 90 degrees, though, a Flat H horn can now be used and the device for rotation can be employed.

Furthermore it is possible to change the uniform dimensions and/or rectangular forms of the strip conductor structures. As a result, strip conductor structures with different forms and dimensions can easily also occur, for example, on different printed circuit boards or on different sides of a printed circuit board or in different rows on one side of a printed circuit board or alternatingly within one row or in a different arrangement.

In the exemplary embodiments shown, the rectangular strip conductor structures are arranged so that they form the rows that are parallel to one another and perpendicular to one another, wherein the rows that extend perpendicularly to one another respectively intersect in the center of a strip conductor structure. However, it is easily conceivable for the rows which are parallel to each other to be offset from each other so that the rows that extend perpendicularly to each other no longer intersect in the center of one strip conductor structure, but in the center of four respective strip conductor structures, i.e. at the intersecting point or contacting point of four respective elementary cells. Furthermore, instead of the axially symmetrical disposition of the strip conductor structures, it is conceivable to use a radially symmetrical disposition of them.

Moreover, it is conceivable to dispose a number of printed circuit boards one behind the other in the beam direction.

What is claimed is:

1. A device for changing the polarization of an incident electromagnetic wave comprising:

a planar dielectric printed circuit board with a front side, a substrate and a back side; and a plurality of homogeneously distributed strip conductor structures disposed on the front and back sides of the printed circuit board where the printed circuit board is composed of an array of elementary cells, each elementary cell including one said strip conductor structure on the front side of the printed circuit board, one said strip conductor structure on the back side of the printed circuit board which is disposed opposite the one said front side strip conductor structure and the substrate of the printed circuit board between the one said front and one said back side strip conductor structures;

wherein, each front side strip conductor structure has two main axes (x, y) disposed in a plane on the front side of the printed circuit board, each back side strip conductor structure has two main axes (ξ, ψ) disposed in a plane on the back side of the printed circuit board, and, in each elementary cell, the respective main axes of the one said front and one said back side strip conductor structures are angled relative to one another by a predetermined angle greater than zero.

2. The device according to claim 1, wherein at least one of each individual strip conductor structure on the front side of the printed circuit board has a different geometry in each direction of the two main axes (x, y), and each individual strip conductor structure on the back side of the printed circuit board has a different geometry in each direction of the two main axes (ξ, ψ).

3. The device according to claim 2, wherein the front and back side strip conductor structures have the form of one of rectangles, crosses and ellipses.

4. The device according to claim 1, wherein, in each elementary cell, if the one said front and one said back side strip conductor structures are circumscribed by polygons, the front and back strip conductor structures are disposed in such a way that projections of the circumscribed polygons onto the plane of the front side of the printed circuit board intersect one another.

5. The device according to claim 1, wherein, in each elementary cell, the one said front and one said back side strip conductors are disposed in such a way that projections of the front and back side strip conductors onto the plane of the front side of the printed circuit board intersect one another.

6. The device according to claim 5, wherein, in each elementary cell, the projection of the intersecting point of the main axes (x, y) of the strip conductor structure of the front side of the printed circuit board onto the plane of the front side of the printed circuit board coincides with the projection of the intersecting point of the main axes (ξ, ψ) of the strip conductor structure of the back side of the printed circuit board onto the plane of the front side of the printed circuit board.

7. The device according to claim 1, wherein at least one of: all of the strip conductor structures of at least one side of the printed circuit board have the same form and the same dimensions; and all of strip conductor structures of at least one side of the printed circuit board have uniform distances from one another in at least one direction.

8. The device according to claim 1 wherein the individual strip conductor structures of each side of the printed circuit board are aligned parallel to one another, and the individual strip conductor structures of each side of the printed circuit board are disposed symmetrically in relation to at least one axis disposed in the planar surface of the printed circuit board.

9. The device according to claim 8, wherein at least one of the individual strip conductor structures of each side of the printed circuit board are disposed collaterally in rows that extend perpendicularly to each other, and the individual strip conductor structures of each side of the printed circuit board are disposed in a radially symmetrical manner.

10. The device according to claim 1, wherein the device includes a number of dielectric printed circuit boards each said printed circuit board being disposed with their flat sides parallel to one another, one behind the other.

11. The device according to claim 10, wherein the printed circuit boards are disposed one behind the other in a congruent fashion.

12. The device according to claim 6, wherein the device has only one planar dielectric printed circuit board, the individual strip conductor structures of each side of the printed circuit board are aligned parallel to one another, and the individual strip conductor structures of each side of the printed circuit board are disposed symmetrically in relation to at least two axes disposed in the planar surface of the printed circuit board in such a way that the individual strip conductor structures of each side of the printed circuit board are disposed collinearly in rows that extend perpendicularly to one another, and that the rows that extend perpendicularly to one other on one side of the printed circuit board respectively intersect in the center of a strip conductor structure.

13. The device according to claim 12, wherein on the front side of the printed circuit board, the strip conductor structures have the form of rectangles (R1) which have approximate edge lengths of 3.35 mm and 1.65 mm, on the back side of the printed circuit board, the strip conductor structures have the form of rectangles (R2) which have approximate edge lengths of 0.50 mm and 3.05 mm, the rows of the front side strip conductor structures, which are disposed parallel to the first symmetry axis of the front side of the printed circuit board, have an average distance (A) of approximately 4.0 mm, the rows of back side strip conductor structures, which are disposed parallel to the second symmetry axis of the front of the printed circuit board, have an average distance (B) of approximately 5.2 mm, and in each elementary cell, the one said front and one said back side strip conductor structures are disposed in such a way that the two main axes (x, y) of the front side strip conductor structure, which are disposed in the plane of the front side of the printed circuit board, and the two main axes (ξ, ψ) of the back side strip conductor structure, which are disposed in the plane of the back side, are respectively angled in relation to one another by a predetermined angle that is approximately 33 degrees, the substrate of the printed circuit board having a thickness of approximately 1.57 mm and permittivity of approximately 2.33.

14. The device according to claim 8, wherein the front side strip conductor structures have the form of rectangles (R1) which have approximate edge lengths of 2.76 mm and 1.38 mm, the back side strip conductor structures have the form of rectangles (R2) which have approximate edge lengths of 0.30 mm and 2.58 mm, the rows of front side strip conductor structures, which are disposed parallel to the first symmetry axis of the front side of the printed circuit board, have an average distance (A) of approximately 4.74 mm, the rows of back side strip conductor structures, which are disposed parallel to the second symmetry axis of the front side of the printed circuit board, have an average distance (B) of approximately 3.01 mm, and in each elementary cell, the one said front and one said back side strip conductor structures are disposed in such a way that the two main axes (x, y) of the front side strip conductor structure, which are disposed in the plane of the front side, and the two main axes (ξ, ψ) of the back side strip conductor structure, which are disposed in the plane of the back side, are respectively angled in relation to one another by an angle of approximately 32 degrees, the substrate of the printed circuit board having a thickness of approximately 1.52 mm and a permittivity of approximately 2.5.

15. A use of a device according to claim 1 to change the polarization of an incident electromagnetic wave from linear polarization into circular polarization or vice versa.

16. A use of a device according claim 1 to rotate the polarization of an incident electromagnetic wave by a fixed angle.

17. The use according to claim 16, wherein the fixed angle is approximately 90 degrees.

* * * * *